United States Patent
Ku et al.

(10) Patent No.: US 12,512,847 B2
(45) Date of Patent: Dec. 30, 2025

(54) WIDEBAND AND MULTI-CHANNEL REAL-TIME IQ DATA RECORDING WITH FPGA-BASED LOSSLESS COMPRESSION

(71) Applicant: VIAVI SOLUTIONS INC., Chandler, AZ (US)

(72) Inventors: Bon-Jin Ku, Seoul (KR); Chang-Hyun Park, Goyang-si (KR); Seung-Gon Hong, Incheon (KR)

(73) Assignee: VIAVI SOLUTIONS INC., Chandler, AZ (US)

( * ) Notice: Subject to any disclaimer, the term of this patent is extended or adjusted under 35 U.S.C. 154(b) by 312 days.

(21) Appl. No.: 18/352,425

(22) Filed: Jul. 14, 2023

(65) Prior Publication Data
US 2025/0023576 A1    Jan. 16, 2025

(51) Int. Cl.
*H03M 1/12*      (2006.01)
*H04B 1/00*      (2006.01)

(52) U.S. Cl.
CPC .......... *H03M 1/124* (2013.01); *H04B 1/0007* (2013.01)

(58) Field of Classification Search
CPC ............................ H03M 1/124; H04B 1/0007
USPC ........................................................ 341/155
See application file for complete search history.

(56) References Cited

U.S. PATENT DOCUMENTS

| | | | |
|---|---|---|---|
| 9,014,307 B2* | 4/2015 | Seely | H04L 27/0008 375/350 |
| 2006/0122814 A1* | 6/2006 | Beens | G06F 15/7864 702/189 |
| 2016/0028498 A1* | 1/2016 | Verspecht | H03D 7/1441 455/226.1 |
| 2017/0288695 A1* | 10/2017 | Feng | H03M 7/50 |
| 2020/0204200 A1* | 6/2020 | Pihl | H04B 1/1607 |

OTHER PUBLICATIONS

Rigel, et al. "FPGA-Based Lossless Data Compression using Huffman and LZ77 Algorithms"; Department of Electrical and Computer Engineering University of Waterloo, Waterloo, Ontario, Canada, N2L 3G1; 0840-7789/07/$25.00 © 2007 IEEE, pp. 4.

* cited by examiner

*Primary Examiner* — Jean B Jeanglaude
(74) *Attorney, Agent, or Firm* — Mannava & Kang, P.C.

(57) ABSTRACT

Field programmable gate array (FPGA) based lossless data compression may be used in a test device such as a spectrum analyzer to efficiently reduce the data transfer rate and needed memory. Multi-channel IQ data may be flexibly recorded using multiple lanes of high data rate connections such as JESD204B/C and PCIe between an analog-digital-converter (ADC), the FPGA, and a processor. Bandwidth, sample rate, and/or bit number may determine the IQ data size. When the IQ data size is less than a product of the compression coefficient and the data transfer rate, the lossless compression may be skipped saving logic usage and power consumption in FPGA. Thus, depending on memory and transfer rate perspectives, a decision may be made whether the compression needs to be used or not.

20 Claims, 7 Drawing Sheets

WIDEBAND AND MULTI-CHANNEL REAL-TIME IQ DATA RECORDING WITH FPGA-BASED LOSSLESS COMPRESSION

TECHNICAL FIELD

This patent application is directed to spectrum analyzers, and more specifically, a multi-channel spectrum analyzer with multi-channel analog-digital-converters (ADCs), where wideband and multi-channel real-time IQ data is recorded using field programmable gate array (FPGA) based lossless compression.

BACKGROUND

A cell site, also known as a cell tower or cellular base station, includes an antenna and electronic communications equipment to support cellular mobile device communication. The antenna and equipment are typically placed in connection with a radio mast or tower, and the equipment generally connects cell site air interfaces to wireline networks, which may be comprised of fiber optic cables and coaxial cables. When setting up or maintaining a cell site, technicians use, among other test devices, spectrum analyzers, typically portable spectrum analyzers, to test signal strength, frequency, phase, interference, etc.

At a cell site, there may be a variety of signals depending on technology, e.g., 4G Long Term Evolution (LTE), 5G New Radio (NR), Dynamic Spectrum Sharing (DSS), etc. Additionally, other signals such as Citizens Broadband Radio Service (CBRS) and similar communication signals may also be present and potentially interfere with the cellular network signals. Configuring instruments to evaluate the RF performance of the channel under test in these environments where channels are dynamically assigned at different locations may be a time-consuming process for RF engineers. Furthermore, data recording, specifically IQ data recording, for wide bandwidth signals requires higher data rate and internal memory, which may limit analysis of higher bandwidth RF signals.

BRIEF DESCRIPTION OF DRAWINGS

Features of the present disclosure are illustrated by way of example and not limited in the following Figure(s), in which like numerals indicate like elements, in which.

DETAILED DESCRIPTION

Figure 1:
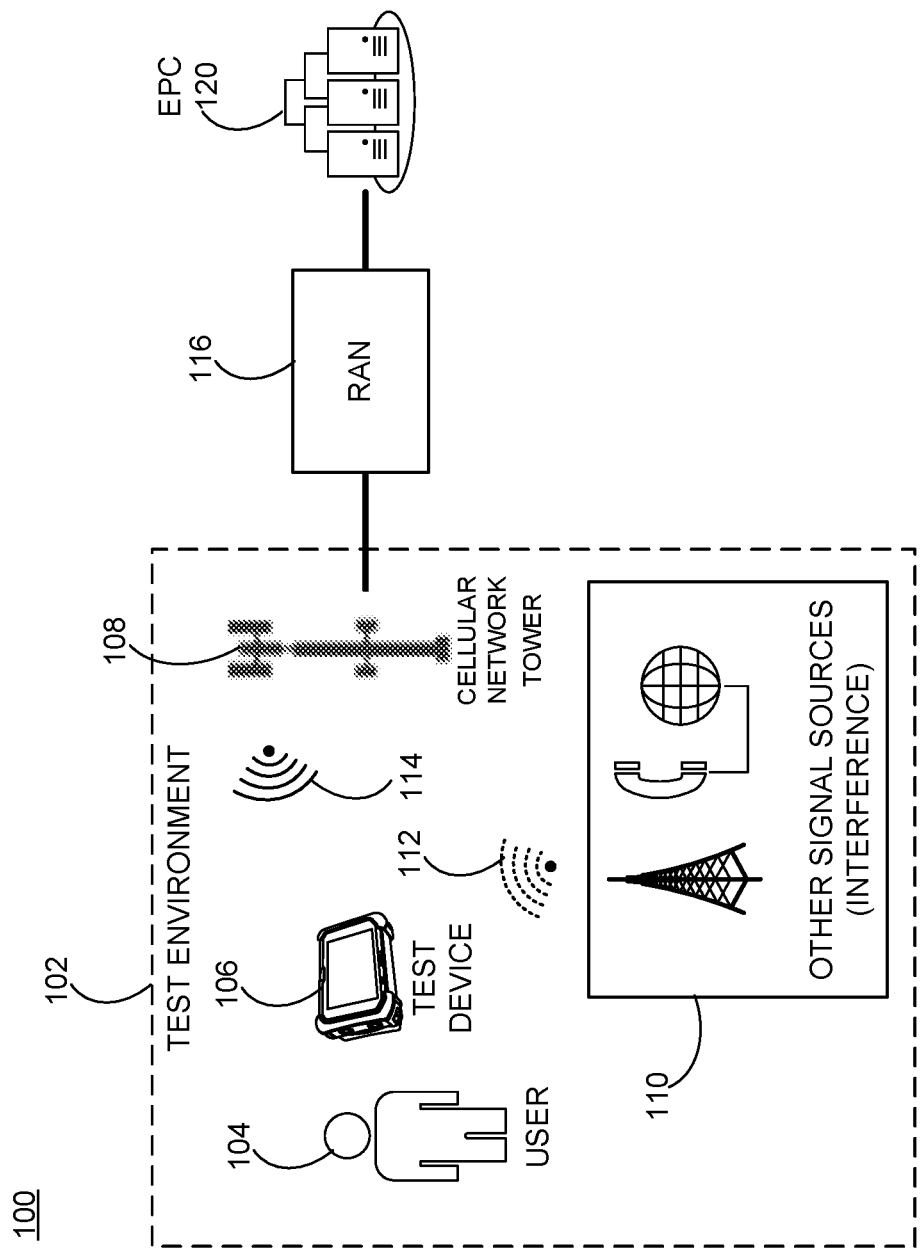
FIG. 1 illustrates a diagram of a test device in a test environment, according to an example.

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Advanced spectrum analyzers record real-time in-phase and quadrature-phase (IQ) data for wideband bandwidth and multi-channel 5G and 6G signals. IQ data recording for wide bandwidth signals requires higher data rate and internal memory, which may limit the analysis of higher bandwidth RF signals. Multi-channel IQ data need to be recorded for various RF signals input on the spectrum analyzer.

In some examples of the present disclosure, a test device such as a spectrum analyzer may include an FPGA-managed ADC subsystem, which may include one or more ADCs with similar or differing characteristics. To address the higher data rate and internal memory requirements of IQ data recording for wide bandwidths, FPGA-based lossless data compression may be used and data transfer rate and needed memory efficiently reduced. Bandwidth, sample rate, and bit number per each ADC path, and numbers of the ADC and the RF signal paths may determine the IQ data size. Values of the bandwidth, sample rate, and bit number parameters may be selected by users from the test user interface, for example. Data transfer rate may be determined by the speed of data connections. Multiple PCIe connections may be used to increase the transfer rate for recording large amounts of IQ data. USB and/or Flash memories may be used to store the IQ data in parallel. A processor (e.g., a central processing unit "CPU") receiving the data from the FPGA may activate or deactivate the compression based on a comparison of IQ data size and data transfer rate. The CPU may use a threshold formula such as IQ_data_size>C×data_transfer_rate, where C is a compensation coefficient, which may be evaluated during development and testing of the test device. If the IQ data size exceeds the data transfer rate (or C times data transfer rate), the CPU may turn on the compression/decompression. Otherwise, the IQ data may be stored and transferred uncompressed.

Some advantages and benefits of the systems and methods described herein are readily apparent. For example, wideband and/or multi-channel IQ data may be transferred and stored efficiently and continuously without additional logic circuitry and power consumption. Thus, accurate testing and analysis of wideband network signals and any interfering signals may be accomplished with smaller form-factor spectrum analyzers, which, in turn, may improve overall performance of a communications network by allowing more accurate field measurements. Other benefits and advantages may also be apparent.

FIG. 1 illustrates a diagram 100 of a test device 106 in a test environment 102, according to an example. As shown in the diagram 100, a user 104 may use a test device 106 to test and analyze signals 114 from a cellular network tower 108, as well as other signals 112, which may come from other signal sources 110 such as a radio tower, telecom signals, and others, which may interfere with the signals 114 from the cellular network tower 108. The cellular network tower 108 may be part of a cell site and connected to backhaul via a radio access network (RAN) 116 and the backhaul may connect to Evolved Packet Core (EPC) 120.

A connection between the cellular network tower 108 and the rest of the world may be referred to as a backhaul link or simply backhaul. A backhaul may include wired, fiber optic and wireless components, such as microwave transmission equipment. In conventional 3G and 4G architectures, fronthaul is associated with a RAN 116 architecture including centralized base band units (BBUs), i.e., baseband controllers, and standalone remote radio heads (RRHs) installed at remote cell sites. These BBU and RRH functional blocks, as well as the equipment that performs these functions, are located further away from each other than in prior mobile backhaul models. In some instances, the RRH and BBU are at the same location. In other instances, the RRH is located at the cell site, whereas the BBU is located in a centralized and protected location where it serves multiple RRHs. The optical links that interconnect the BBU and the multiple RRHs are referred to as fronthaul. The fronthaul includes interfaces between the RRH and the BBU. The backhaul includes interfaces between the BBU and the EPC 120.

In an example, the test environment 102 may include the cell site, which includes the cellular network tower 108 or cellular base station having antennas and electronic communications equipment to support cellular mobile device communication. The antennas and equipment are typically placed in connection with a radio mast or tower, and the equipment generally connects cell site air interfaces to wireline networks, which may include fiber optic cables and coaxial cables. Typically, the cell site may be connected to backhaul via the RAN 116 and the backhaul may connect to the EPC 120.

The RAN is the part of a mobile network that connects end-user devices, like smartphones, to the cloud. This is achieved by sending information via radio waves from end-user devices to a RAN's transceivers, and finally from the transceivers to the core network which connects to the global internet. Diagram 100 shows the test device 106 performing signal analysis. In an example, the user 104, such as a cellular service provider technician, may use the test device 106 to perform signal analysis for discovered carrier frequency and technology as well as discovered channels of selected technologies. Furthermore, interference hunting and beam centric electromagnetic field (EMF) testing on a selected carrier may be performed with the test device 106. In an example use case, the testing may be performed when the cell site is being installed, such as to ensure proper operation of the cell site with user devices, such as smartphones or other end user cellular devices. In another example use case, after installation, customers of the cellular service provider may be having technical issues, and the user 104 may use the test device 106 to check for signal interference from the other signal sources 110 or other potential causes of the technical issues so the technical issues can be resolved.

As discussed above, the test device 106 may be operable to perform an analysis on selected channels (by the user 104 or automatically). Carrier frequencies of available channels for one or more technologies may also be detected automatically or by the user 104. The carrier frequencies may be a center frequency and/or a synchronization signal block (SSB) frequency depending on the technology. The technologies may include, but are not limited to, 4G LTE, 5G NR, 6G, and DSS. Additional examples of the technologies may include LTE-FDD, LTE-TDD, NR, DSS-FDD, DSS-TDD where FDD is frequency division duplex and TDD is time division duplex.

Accurate testing and analysis of network signals and any interfering signals may improve overall performance of a communications network. However, supporting high performance functions with various frequency and bandwidths, especially at and above 6 GHZ, may be a challenge for spectrum analyzers. While analysis of various signals involves a number of components and their respective performance characteristics in the test device 106, wideband and multi-channel signals (e.g., 5G, 6G) are recorded in real-time using IQ data, which requires higher data transfer rates and larger internal memory capacity. Through the use of FPGA-based lossless data compression, an overall efficiency and performance of the spectrum analyzer (test device 106) may be increased.

Figure 2:
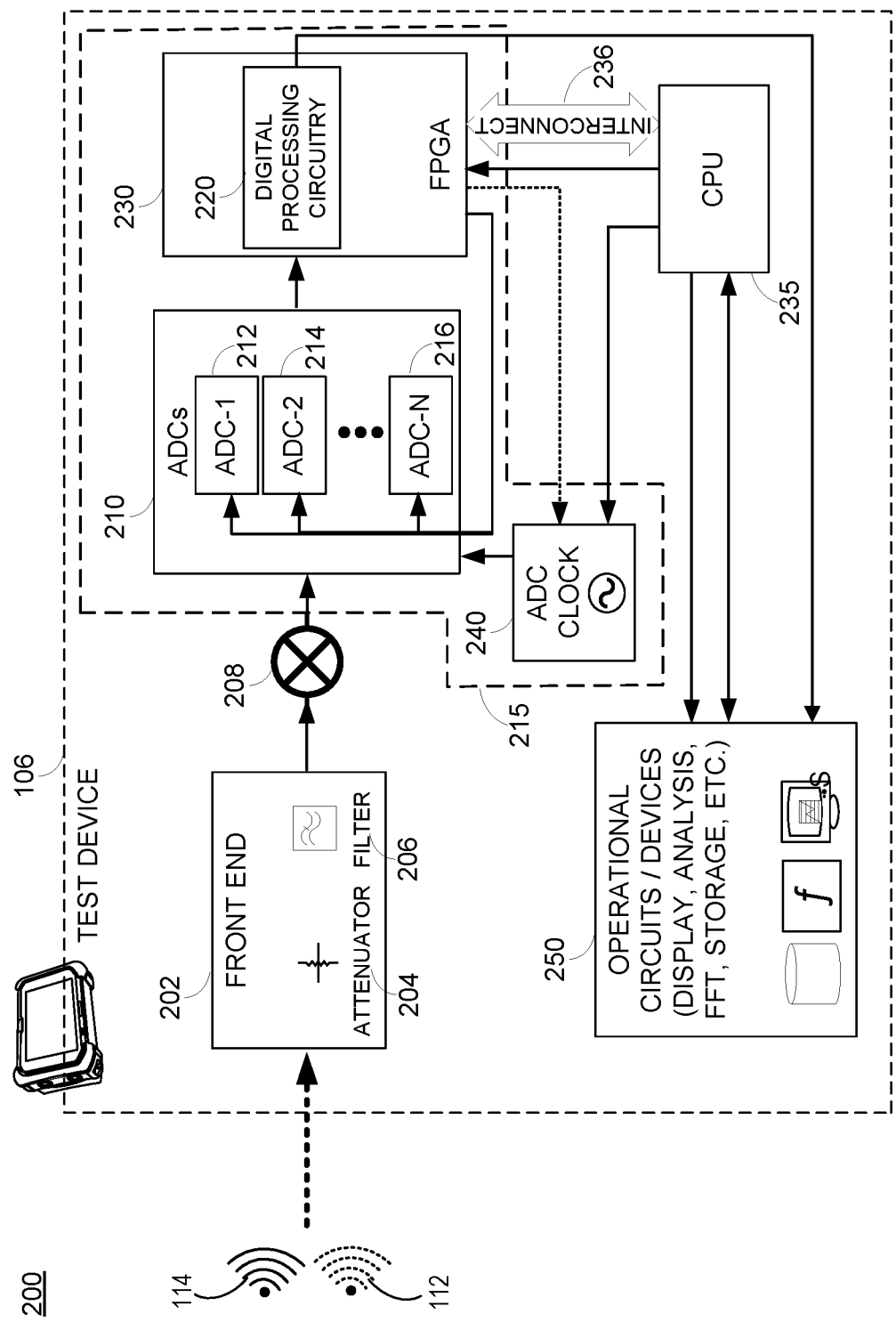
FIG. 2 illustrates a block diagram of major components of the test device including a multi-channel ADC subsystem managed by a field programmable gate array (FPGA), according to an example.

FIG. 2 illustrates a block diagram 200 of major components of the test device 106 including a multi-channel ADC subsystem 215 managed by a field programmable gate array (FPGA) 230, according to an example. As block diagram 200 shows, the signals 114 (from the cellular network tower 108) and the other signals 112, which may be interference signals, may be input to the test device 106 and pre-processed by a front end 202. The front end 202 may include, among other circuits and subsystems, an attenuator 204 and a filter 206. The attenuated and filtered signal (pre-processed RF signal) may be down-converted at a mixer 208, and the down-converted signal provided to ADCs 210 of the multi-channel ADC subsystem 215. The multi-channel ADC subsystem 215 may include any number of multi-channel ADCs 210, such as ADC-1 212, ADC-2 214, to ADC-N 216, the FPGA 230, and an ADC sample clock 240. The ADCs 210 may receive one or more clock signals from the ADC sample clock 240 to sample the input signal(s) and convert them to digital outputs. A CPU 235 may manage one or more components of the test device 106 such as ADC sample clock 240, FPGA 230, and at least some of the operational circuits and devices 250 (also referred to as operational subsystems).

In some examples, the multi-channel ADC subsystem 215 may be managed, that is, suitable ADCs selected for analog-digital conversion of input signals, by the FPGA 230. Digital output of the selected ADCs may be provided to digital processing circuitry 220, which may be partially or wholly implemented in the FPGA 230. The digital processing circuitry 220 may include detectors, normalizers, filters, etc. Digitally processed signals may be provided by the multi-channel ADC subsystem 215 to operational circuits and devices 250, which may perform analytical operations such as displaying the signals, fast Fourier transforms (FFTs), storing the signals and/or analysis results, and similar operations. Thus, the operational circuits and devices 250 may include an analysis subsystem, a display subsystem, an FFT subsystem, a storage subsystem, and comparable subsystems and circuits.

In some examples, the CPU 235 may communicate with other components over various interfaces and control their operations. For example, the CPU 235 may control the ADC sample clock 240 and set clock frequencies to be provided to selected ADCs. The ADC sample clock 240 may alternatively be controlled by the FPGA 230. The CPU 235 and the FPGA 230 may also communicate over a peripheral component interconnect (PCI) interface (interconnect 236). For example, processed (spectrum-analyzed) data may be transmitted by the FPGA 230 to the CPU 235 to be further processed and/or displayed.

As mentioned herein, the test device 106 may be a spectrum analyzer (for example, a portable spectrum analyzer to be used in the field) and may include additional circuitry and subsystems such as a voltage-controlled oscillator (VCO) for the mixer 208, additional filters, mixers, oscillators, a frequency synthesizer, and so on. Thus, the analog input signal(s) may be processed by any number of analog processing circuitry and the digital signals converted by the multi-channel ADC subsystem 215 may be processed by any number of digital processing circuitry.

It should be appreciated that FIG. 2 shows a simplified block diagram of major components of the test device 106. A test device such as a spectrum analyzer may be implemented with additional of fewer components, where certain functionality may be distributed among various components and sub-systems or performed by additional components or sub-systems. Furthermore, the test device 106 may be any RF test device including, but not limited to, a spectrum analyzer, a cellular system monitoring device, an RF power analyzer, etc.

Figure 3A:
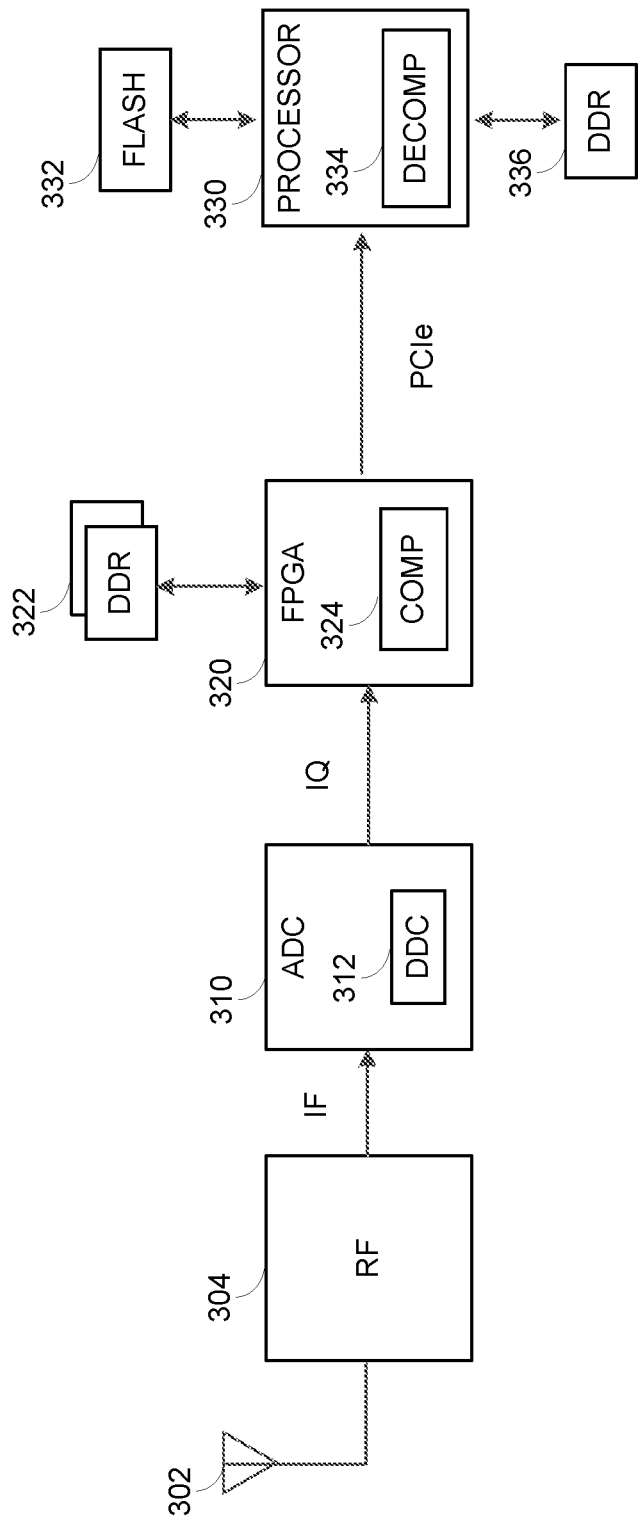
FIG. 3A illustrates a block diagram of a single channel ADC subsystem managed by the FPGA, according to an example.

FIG. 3A illustrates a block diagram 300A of a single channel ADC subsystem 310 managed by an FPGA 320, according to an example. The block diagram 300A shows an RF signal received through an antenna 302 (or other similar RF connection) being processed by an RF block 304, and a resulting IF signal being provided to the ADC 310. The ADC 310 may include a digital down-converter (DDC) 312. Digitized IF signals (IQ data) may be provided to an FPGA 320, where the data may be losslessly compressed (324). At least some of the data may be stored in random access memory such as Double Data Rate (DDR) 322. The compressed data may be provided to a processor 330 over high bandwidth data connections such as PCIe. The compressed data may be decompressed (334) at the processor 330, which may use a flash memory 332 and DDR 336 to store data.

In some examples, as shown in diagram 300A, the RF block 304 may include an attenuator, a filter, and similar RF processing circuitry along with a mixer to reduce the RF frequencies to IF frequencies. The ADC 310 may be a single channel ADC arranged to receive wideband signals. Fast ADCs deliver large amounts of data; however, a signal of interest may represent a small proportion of that bandwidth. A digital down converter (DDC) allows the rest of the received data to be discarded, allowing more intensive processing to be performed on the signal of interest. A first stage of the DDC uses a digital mixer to translate the frequency of interest down to baseband. It uses a pair of multipliers and a direct digital synthesizer (DDS) as a numerically controlled oscillator (NCO). A second stage of the DDC may reduce the sampling frequency of the signal to match a desired output bandwidth. The DDC may use a cascaded integrator comb (CIC) filter to decimate the data. A second CIC filter may provide a coarse gain adjustment stage. The signal may then be passed to a pair of additional polyphase filters, a compensation finite impulse response (CFIR) filter and a programmable finite impulse response (PFIR) filter, which provide additional decimation and final signal shaping prior to the rounding stage and final output. The IF signal in an example subsystem may enter through the analog inputs of the ADC 310, pass through the ADC core, into the DDC 312, and then transmitted through a JESD204B serializer and JESD204B/C serial output lanes to the FPGA 320.

Digitized IF signals from the ADC 310 may be provided to the FPGA 320 over a high-speed data transfer interface (HSI). For example, the HSI may be a standard interface according to Joint Electronic Device Engineering Council "JEDEC" standard JESD204B/C. The transferred data may be processed and/or stored by the FPGA 320 (e.g., DDR 322 or a USB memory). The processor 330 may decompress (334) the compressed data and store processed data in a flash memory 332 and/or DDR memory 336.

In a practical implementation example, for a 100 MHz bandwidth signal, approximately 4 Mbits of IQ data may need to be stored for each second of the signal (122.88 Msps×2 (I,Q)×16 bit=3,932.16 Mbits). For a 400 MHz bandwidth signal, approximately 16 Mbits of IQ data may need to be stored for each second of the signal (491.52 Msps×2 (I,Q)×16 bit=15,728.64 Mbits). Thus, lossless compression of the data at the FPGA may reduce needed memory space (and transmission capacity) substantially.

Figure 3B:
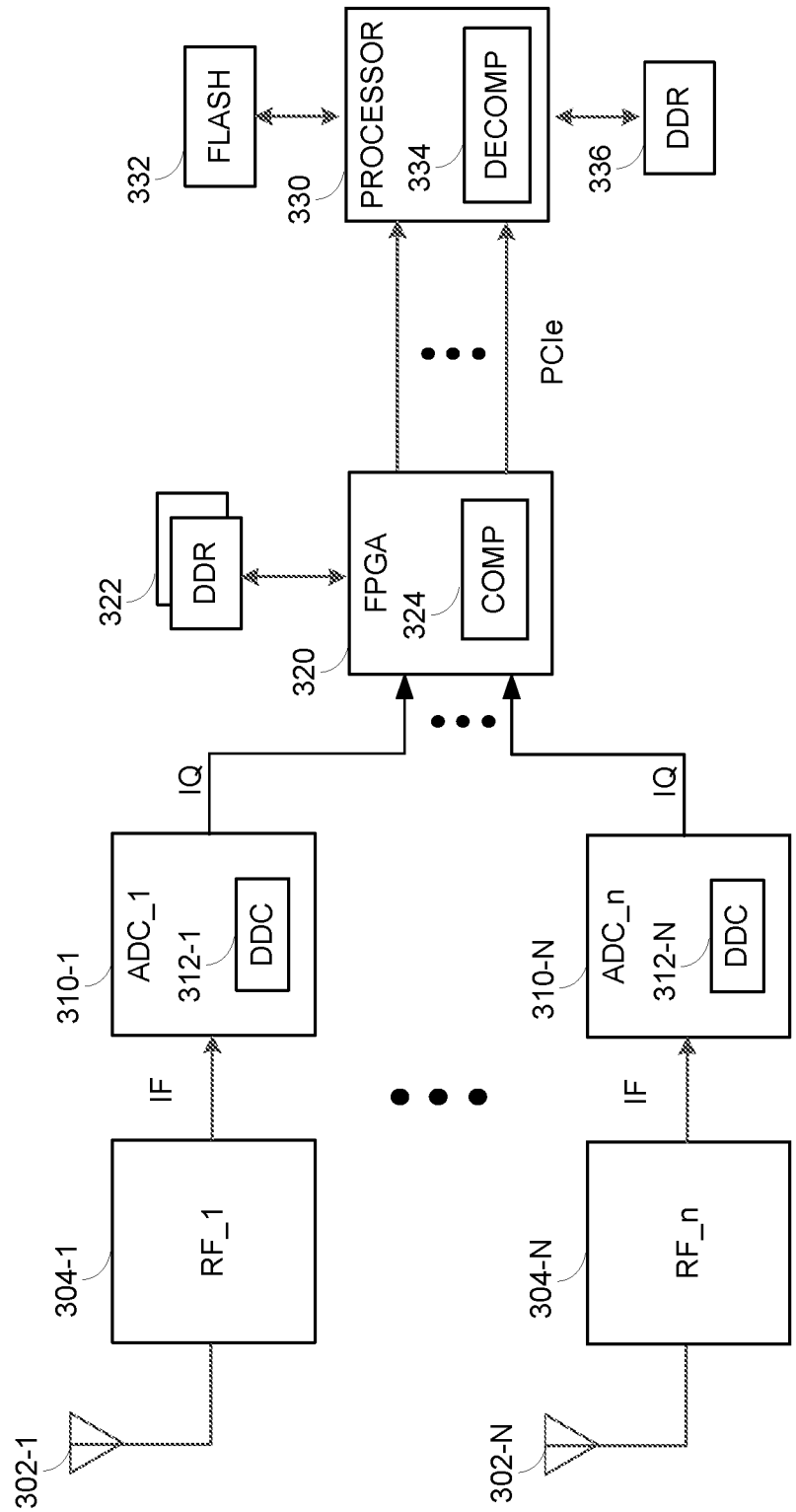
FIG. 3B illustrates a block diagram of a multi-channel ADC subsystem managed by the FPGA, according to an example.

FIG. 3B illustrates a block diagram 300B of a multi-channel ADC subsystem 310-X managed by the FPGA 320, according to an example. The block diagram 300B shows a plurality of RF input circuitry and ADCs, where an RF signal received through an antenna 302-X (302-1 through 302-N) (or other similar RF connection) is processed by a respective RF block 304-X (304-1 through 304-N), and a resulting IF signal is provided to a respective ADC 310-X (310-1 through 310-N). Each ADC 310-X may include a digital down-converter (DDC) 312-X (312-1 through 312-N). Digitized IF signals (IQ data) from the ADCs may be provided to the FPGA 320, where the data may be losslessly compressed (324). At least some of the data may be stored in random access memory such as Double Data Rate (DDR) 322. The compressed data may be provided to a processor 330 over high bandwidth data connections such as PCIe. The compressed data may be decompressed (334) at the processor 330, which may use a flash memory 332 and DDR 336 to store data.

In some examples, as shown in diagram 300B, the RF blocks 304-1 through 304-N may include an attenuator, a filter, and similar RF processing circuitry along with a mixer to reduce the RF frequencies to IF frequencies. The ADCs 310-1 through 310-N may allow multiple channel conversion arranged to receive wideband signals. The IF signal in an example subsystem may enter through the analog inputs of the ADCs 310-1 through 310-N, pass through the ADC cores, into the DDCs 312-1 through 312-N, and then transmitted through one or more JESD204B serializers and JESD204B/C serial output lanes to the FPGA 320. The transferred data may be processed and/or stored by the FPGA 320 (e.g., DDR 322 or a USB memory). The processor 330 may decompress (334) the compressed data and store processed data in a flash memory 332 and/or DDR memory 336. The processor 330 may also determine whether the digital IQ data is to be compressed based at least on a size of the digital IQ data or a data transfer rate between the FPGA 320 and the processor 330, and control activation/deactivation of the compression at the FPGA 320.

Some example signals may include 2195 MHz (with a bandwidth of 800 MHZ), 1200 MHz (with a bandwidth of 400 MHZ), 370 MHz (with a bandwidth of 200 MHZ), and 185 MHZ (with a bandwidth of 100 MHZ). In multi-channel applications, the FPGA 320 may select suitable ADC(s) within available ADCs 310-1 through 310-N based on individual ADC characteristics. As mentioned above, multiple input signals may be received at a multiple channel test device (spectrum analyzer) with different frequencies and bandwidths. The signals may also be of different type (also referred to as technology) such as time division multiplexed, frequency division multiplexed, etc. Multi-channel ADCs typically convert each input channel sequentially using an input multiplexer. Certain applications may require simultaneous conversions, especially when phase information exists between different channels. For example, wireless applications may need I and Q channels to be converted at the same instance. In such scenarios, multiple ADCs and parallel conversions on each channel may be used. Alternatively, simultaneous sampling ADCs may perform simultaneous conversion using multiple track-and-hold (T/H) paths to sample the inputs at the same instant, then perform the conversion for each channel.

Figure 4:
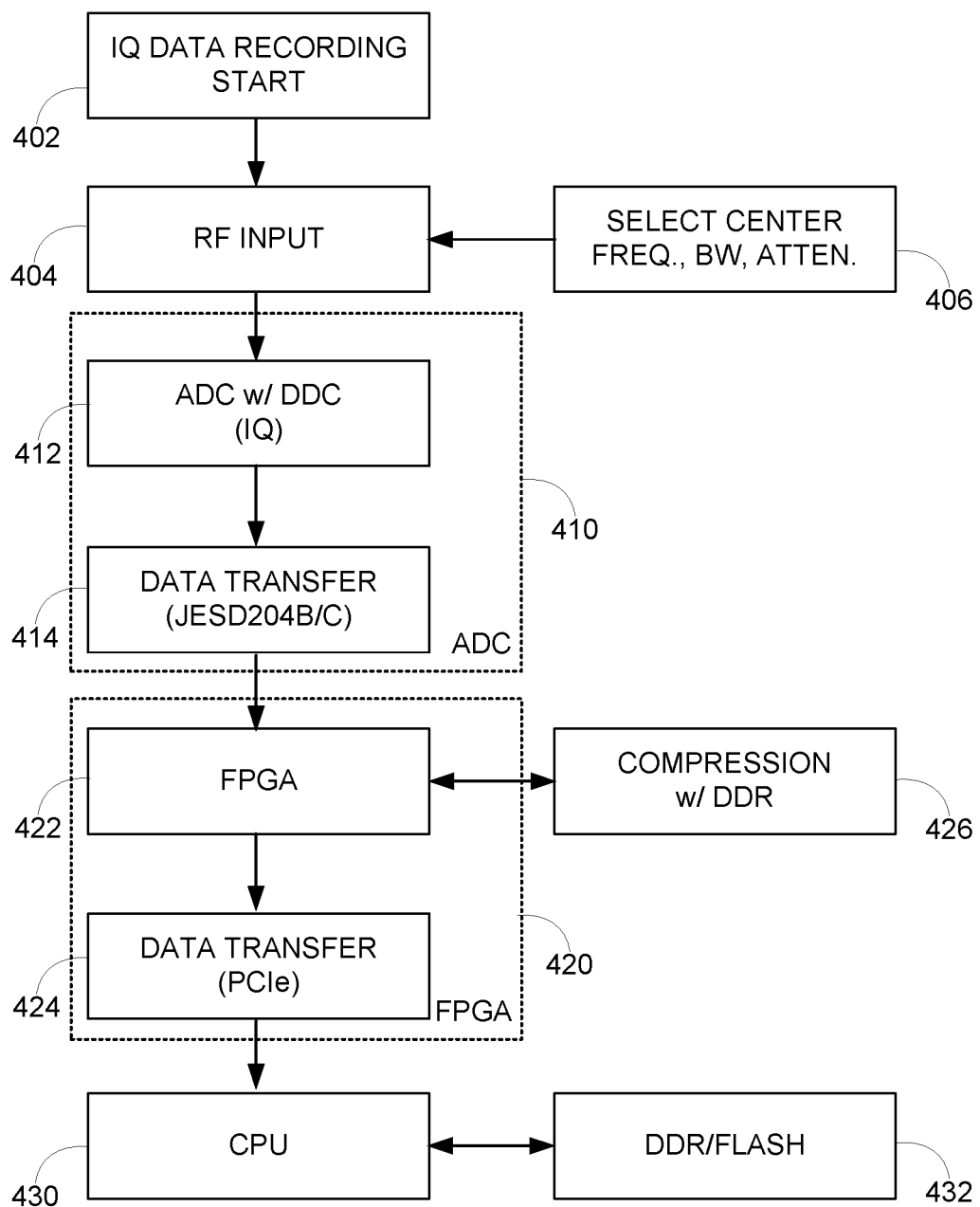
FIG. 4 illustrates a diagram of the major components and data flow in an ADC subsystem managed by the FPGA with lossless compression IQ data recording, according to an example.

FIG. 4 illustrates a diagram 400 of the major components and data flow in an ADC subsystem 310 managed by the FPGA 320 with lossless compression IQ data recording, according to an example. As shown in the diagram 400 IQ data recording starts (402) with RF input processing 404. Parameters 406 for the measurement may be selected by a user or automatically. The parameters 406 may include center frequency, bandwidth, attenuation, etc. The RF input processing 404 may result in down-converted IF signals being provided to an ADC subsystem 410, where an ADC 412 (or multiple ADCs for different channels) with a DDC may digitize the analog IF signals and transfer the data (414) over high-capacity data lines (e.g., JESD204B/C) to an FPGA subsystem 420.

High-capacity data lines, as used herein, refers to serial data communication systems that can provide data exchange rates of up to 16 GB/s (or higher). The high data exchange rates may be achieved through a combination of high-speed communication protocols and electrical architecture. Examples of high-capacity data lines include, but are not limited to, JESD204, PCIe, etc.

In the FPGA subsystem 420, an FPGA 422 may receive the IQ data and compress losslessly (426) using DDR (or USB) memory. The compressed data may then be transferred (424) to a processor (CPU 430) over high data rate connection such as PCIe. The processor may store some or all of the data in a flash or DDR memory 432.

As mentioned herein, FPGA-based lossless data compression can efficiently reduce the data transfer rate and needed memory. Multi-channel IQ data may be flexibly recorded using multiple lanes of JESD204B/C and PCIe. Bandwidth, sample rate, and bit number per each ADC path, and numbers of the ADC and the RF signal paths may determine the IQ data size. Values of the bandwidth, sample rate, and bit number parameters may be selected by users from the test user interface, for example. Data transfer rate may be determined by the speed of data connections. Multiple PCIe connections may be used to increase the transfer rate for recording large amounts of IQ data. USB and/or Flash memories may be used to store the IQ data in parallel. A processor (e.g., a central processing unit "CPU") receiving the data from the FPGA may activate or deactivate the compression based on a comparison of IQ data size and data transfer rate (JESD204B/C and PCIe). The CPU may use a threshold formula such as IQ_data_size>C×data_transfer_rate, where C is a compensation coefficient, which may be evaluated during development and testing of the test device. If the IQ data size exceeds the data transfer rate (or C times data transfer rate), the CPU may turn on the compression/decompression. Otherwise, the IQ data may be stored and transferred uncompressed. Multi PCIe lanes may be used in some implementations to increase the transfer rate for recording large IQ data. USB memories (not shown) and/or flash memory may be used to store the IQ data in parallel.

Figure 5:
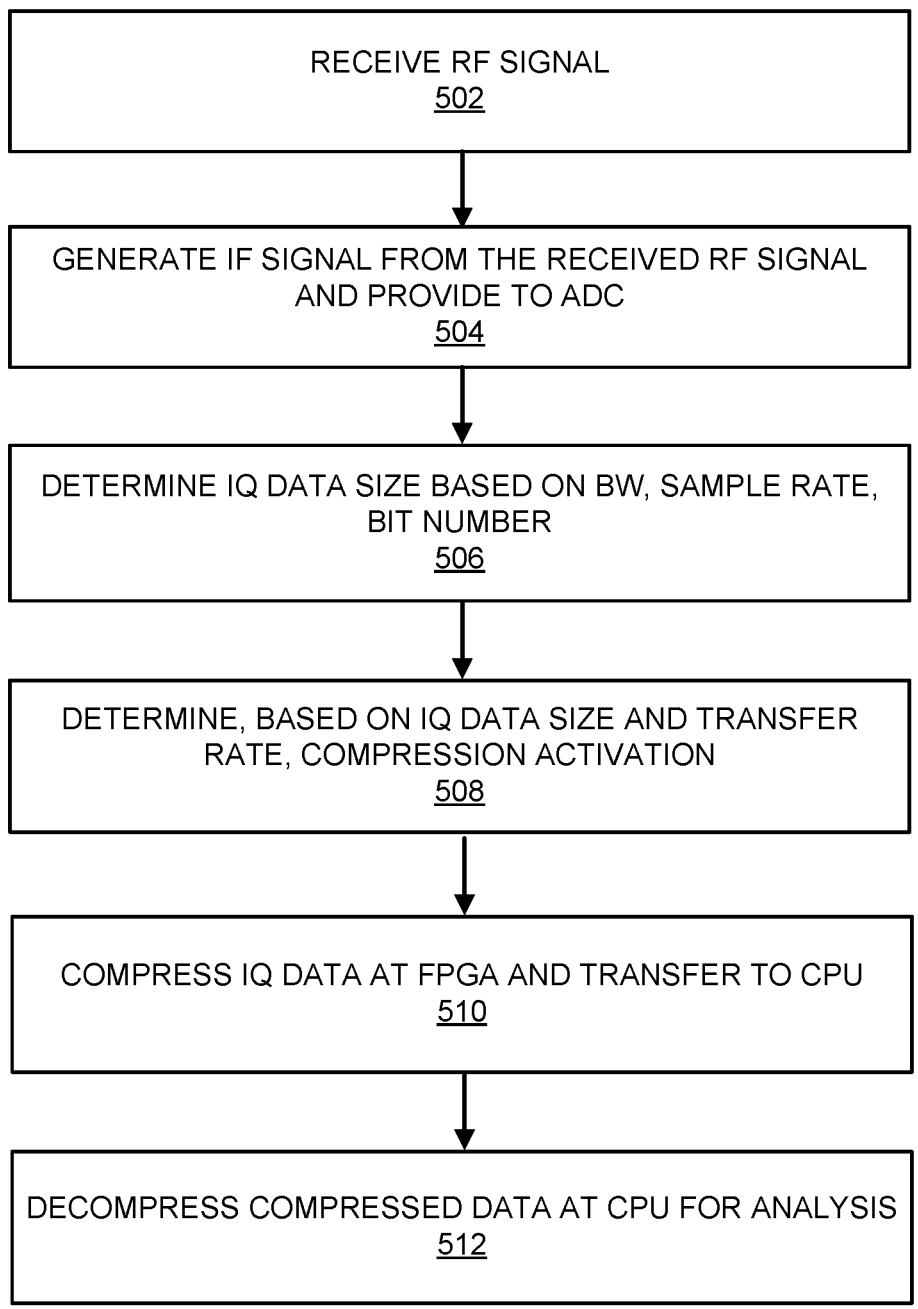
FIG. 5 illustrates a flow chart of a method for employing a multi-channel ADC subsystem with lossless compression IQ data recording in a spectrum analyzer, according to an example.

FIG. 5 illustrates a flow chart of a method 500 for employing a multi-channel ADC subsystem 310 with lossless compression IQ data recording in a spectrum analyzer (e.g., test device 106), according to an example. The method 500 is provided by way of example, as there may be a variety of ways to carry out the method described herein. Although the method 500 is primarily described as being performed by the circuits of FIGS. 2 and 3A-3B, the method 500 may be executed or otherwise performed by one or more processing components of another system or a combination of systems. Each block shown in FIG. 5 may further represent one or more processes, methods, or subroutines, and one or more of the blocks (e.g., the selection process) may include machine readable instructions stored on a non-transitory computer readable medium and executed by a processor or other type of processing circuit to perform one or more operations described herein.

At block 502, the test device 106 may receive one or more input signals (RF signal(s)) with different frequencies, bandwidths, and signal types (e.g., frequency division multiplexing, time division multiplexing, etc. based on a network technology). Along with the input signals, a user selection on the type, frequency, and bandwidth of each received signal may also be received.

At block 504, IF signal(s) may be generated by processing the input RF signal(s) at an RF front end and down-conversion at one or more mixers. The analog IF signal(s) may be provided to an ADC subsystem containing one or more ADCs (single channel or multi-channel). In case of multiple signals, multiple mixers may process the RF signals in parallel and provide to the ADCs simultaneously. Alternatively, a single mixer may down-convert multiple RF signals to corresponding IF signals and provide to the ADCs serially in a time-multiplexed fashion. The ADC(s) may digitize the IF signals and provide as IQ data to the FPGA through multiple lanes of JESD204B/C or similar high data capacity connection.

At block 506, an IQ data (digitized IF data) size may be determined based on bandwidth, sample rate, and/or bit number of the ADC(s). The IQ data size and a transfer rate may be used to determine whether or not to compress the IQ data at block 508. When the IQ data size is less than a product of the compression coefficient and the data transfer rate, the compression may be skipped saving logic usage and power consumption in FPGA.

If IQ data size is larger than the product of the compression coefficient and the data transfer rate, the data may be compressed losslessly at the FPGA and transferred to a processor (e.g., CPU) at block 510. The IQ data may be transferred from the FPGA to the CPU using multiple PCIe lanes, for example.

At block 512, the compressed IQ data may be decompressed at the CPU for analysis, display, storage, etc. The CPU may store the data in USB and/or flash memories. The CPU may also forward some or all of the data to operational circuits 250 of the test device 106 for further usage.

Figure 6:
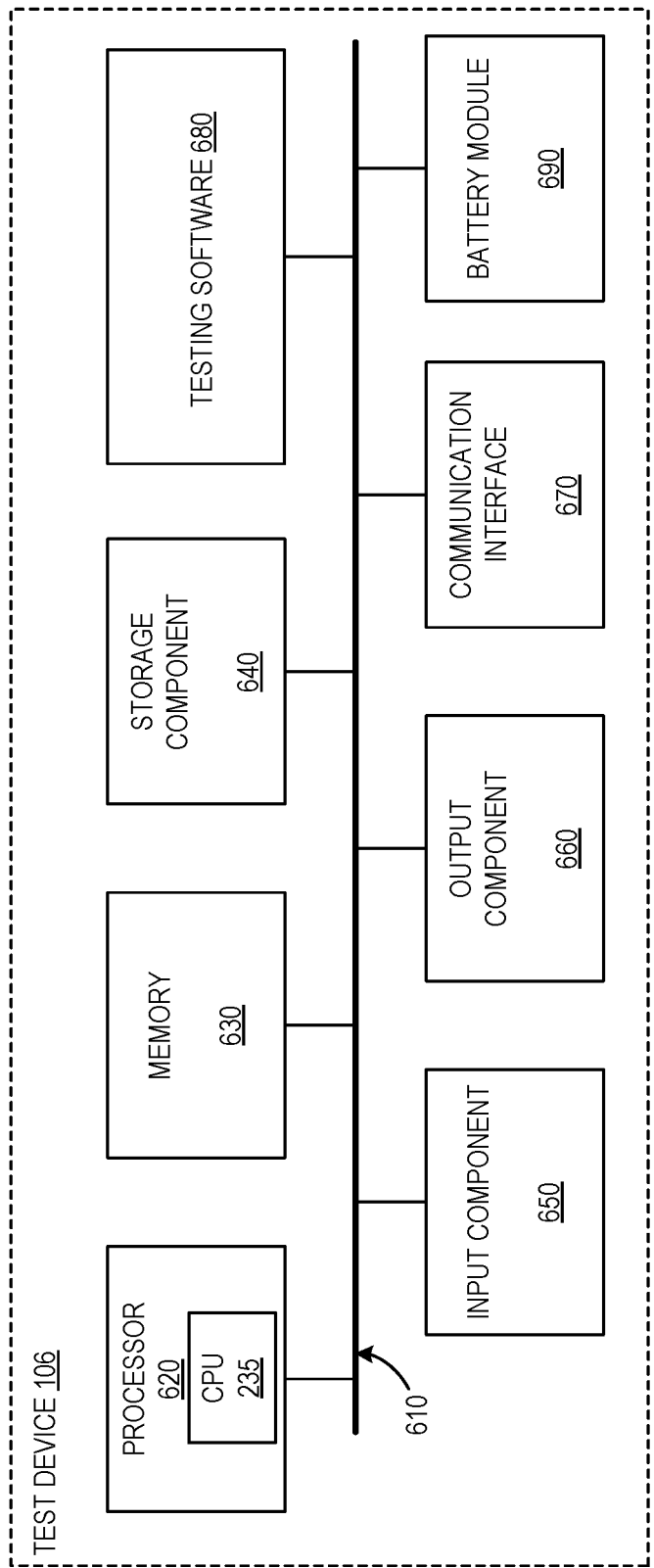
FIG. 6 illustrates a block diagram of the test device, according to an example.

FIG. 6 illustrates a block diagram of the test device 106, according to an example. As shown in block diagram, the test device 106 may include the components of FIG. 2 and the components shown in FIG. 6. The test device 106 may include a bus 610, a processor 620, a memory 630, a storage component 640, an input component 650, an output component 660, a communication interface 670, and battery module 690.

Bus 610 includes a component that permits communication among the components of test device 106. Processor 620 may be implemented in hardware, firmware, or a combination of hardware and software. Processor 620 may include one or more of a central processing unit (CPU) 235, a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some examples, processor 620 may include one or more processors capable of being programmed to perform a function. Memory 630 may include one or more memories such as a random access memory (RAM), a read only memory (ROM), and/or another type of dynamic or static storage device (e.g., a flash memory, a magnetic memory, and/or an optical memory) that store information and/or instructions for use by processor 620.

Storage component 640 stores information and/or software related to the operation and use of test device 106. For example, storage component 640 may include a hard disk (e.g., a magnetic disk, solid state disk, etc.) and/or another type of non-transitory computer-readable medium. Test device 106 may also include testing software 680 executed by the processor 620 to perform various functional tests.

Input component 650 may include a component that permits the test device 106 to receive information, such as via user input (e.g., a touch screen display, a keyboard, a keypad, a mouse, a button, a switch, and/or a microphone). Additionally, or alternatively, input component 650 may include a sensor for sensing information (e.g., a GPS component, an accelerometer, a gyroscope, and/or an actuator). Output component 660 includes a component that provides output information from the test device 106 (e.g., a display, a speaker, a user interface, and/or one or more light-emitting diodes (LEDs)). Output component 660 may include a display providing a GUI. Input component 650 and output component 660 may be combined into a single component, such as a touch responsive display, also known as a touchscreen.

Communication interface 670 may include a transceiver-like component (e.g., a transceiver and/or a separate receiver and transmitter) that enables test device 106 to communicate with other devices, such as via a wired connection, a wireless connection, or a combination of wired and wireless connections. Communication interface 670 may permit the test device 106 to receive information from another device and/or provide information to another device. For example, communication interface 670 may include an Ethernet interface, an optical interface, a coaxial interface, an infrared interface, an RF interface, a universal serial bus (USB) interface, a Wi-Fi interface, a cellular network interface, or the like.

Battery module 690 is connected along bus 610 to supply power to processor 620, memory 630, and internal components of the test device 106. Battery module 690 may supply power during field measurements by the test device 106. Battery module 690 may permit the test device 106 to be a portable.

The test device 106 may perform one or more processes described herein. The test device 106 may perform these processes by processor 620 executing software instructions stored by a non-transitory computer-readable medium, such as memory 630 and/or storage component 640. A computer-readable medium is defined herein as a non-transitory memory device. A memory device includes memory space within a single physical storage device or memory space spread across multiple physical storage devices.

Software instructions may be read into memory 630 and/or storage component 640 from another computer-readable medium or from another device via communication interface 670. When executed, software instructions stored in memory 630 and/or storage component 640 may instruct processor 620 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The test device 106 may include components other than shown. For example, the test device 106 may include a spectrum analyzer and power meter for performing tests described above. The number and arrangement of components shown in FIG. 6 are provided as an example. In practice, the test device 106 may include additional components, fewer components, different components, or differently arranged components than those shown in FIG. 6. Additionally, or alternatively, a set of components (e.g., one or more components) of the test device 106 may perform one or more functions described as being performed by another set of components of the test device 106.

While specific circuit configurations such as the arrangements of a number of components are shown in conjunction with the test device including a multi-channel ADC subsystem managed by an FPGA herein, the illustrated configurations are not intended to be limiting. A test device employing multi-channels ADCs may be implemented with other configurations and component values using the principles described herein.

While examples described herein are directed to configurations as shown, it should be appreciated that any of the components described or mentioned herein may be altered, changed, replaced, or modified, in size, shape, and numbers, or material, depending on application or use case, and adjusted for desired resolution or optimal measurement results.

It should be appreciated that the apparatuses, systems, and methods described herein may minimize and/or reduce analog-digital conversion errors and inaccuracies due to two or more signals with different characteristic being converted by the same ADC, and thereby facilitate more reliable and accurate RF measurements, specifically for input signals with different frequencies, bandwidths, and types. It should also be appreciated that the apparatuses, systems, and methods, as described herein, may also include, or communicate with other components not shown. For example, these may include external processors, counters, analyzers, computing devices, and other measuring devices or systems. This may also include middleware (not shown) as well. The middleware may include software hosted by one or more servers or devices. Furthermore, it should be appreciated that some of the middleware or servers may or may not be needed to achieve functionality. Other types of servers, middleware, systems, platforms, and applications not shown may also be provided at the backend to facilitate the features and functionalities of the testing and measurement system.

Moreover, single components may be provided as multiple components, and vice versa, to perform the functions and features described herein. It should be appreciated that the components of the system described herein may operate in partial or full capacity, or it may be removed entirely. It should also be appreciated that analytics and processing techniques described herein with respect to the optical measurements, for example, may also be performed partially or in full by other various components of the overall system.

It should be appreciated that data stores may also be provided to the apparatuses, systems, and methods described herein, and may include volatile and/or nonvolatile data storage that may store data and software or firmware including machine-readable instructions. The software or firmware may include subroutines or applications that perform the functions of the measurement system and/or run one or more applications that utilize data from the measurement or other communicatively coupled system.

The various components, circuits, elements, components, and interfaces, may be any number of mechanical, electrical, hardware, network, or software components, circuits, elements, and interfaces that serves to facilitate communication, exchange, and analysis data between any number of or combination of equipment, protocol layers, or applications. For example, the components described herein may each include a network or communication interface to communicate with other servers, devices, components or network elements via a network or other communication protocol.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A test device to analyze radio frequency (RF) signals, comprising:
    a front end to receive one or more RF signals and pre-process the received RF signals;
    a mixer to down-convert the pre-processed RF signals;
    an analog-digital converter (ADC) subsystem to:
        receive the down-converted RF signals from the mixer;
        convert the down-converted RF signals to digital IQ data; and
        transmit the digital IQ data over one or more high-capacity connections;
    a field programmable gate array (FPGA) to:
        receive the digital IQ data from the ADC subsystem;
        compress the digital IQ data; and
        transmit the compressed IQ data over other one or more high-capacity connections; and
    a central processing unit (CPU) to:
        determine whether the digital IQ data from the ADC subsystem is to be compressed based on a comparison of a size of the digital IQ data and a data transfer rate; and
        in response to a determination that the size of the digital IQ data is greater than the data transfer rate, activate a compression function at the FPGA to cause the FPGA to compress the digital IQ data.

2. The test device of claim 1, wherein the CPU is further to:
    receive the compressed IQ data from the FPGA;
    decompress the compressed IQ data; and
    one or more of analyze, store, or display the decompressed IQ data.

3. The test device of claim 1, wherein the CPU is further to:
    in response to a determination that the size of the digital IQ data is less than the data transfer rate, deactivate the compression function at the FPGA.

4. The test device of claim 2, wherein the CPU is further to store the decompressed IQ data in one or more of a universal serial bus (USB) memory or a flash memory.

5. The test device of claim 2, further comprising:
    one or more operational subsystems that include at least one of a display subsystem, an analysis subsystem, a fast Fourier transform (FFT) subsystem, or a storage subsystem, wherein the CPU is further to provide at least a portion of the decompressed IQ data to the one or more operational subsystems.

6. The test device of claim 1, wherein the ADC subsystem includes a digital down-converter.

7. The test device of claim 1, wherein the FPGA includes a double data rate (DDR) memory.

8. The test device of claim 1, wherein the one or more high-capacity connections comprise JEESD204B/C connections and the other one or more high-capacity connections comprise PCIe connections.

9. A test device to analyze radio frequency (RF) signals, comprising:
    a front end to receive one or more RF signals and pre-process the received RF signals;
    a mixer to down-convert the pre-processed RF signals;
    a multi-channel analog-digital converter (ADC) subsystem comprising a plurality of ADCs, the ADC subsystem to:
        receive the down-converted RF signals from the mixer;
        convert the down-converted RF signals to digital IQ data; and
        transmit the digital IQ data over a plurality of high-capacity connections;
    a field programmable gate array (FPGA) to:
        receive the digital IQ data from the ADC subsystem;
        compress the digital IQ data; and
        transmit the compressed IQ data over other one or more high-capacity connections; and
    a central processing unit (CPU) to:
        determine whether the digital IQ data from the ADC subsystem is to be compressed based on a comparison of a size of the digital IQ data and a data transfer rate; and
        in response to a determination that the size of the digital IQ data is greater than the data transfer rate, activate a compression function at the FPGA to cause the FPGA to compress the digital IQ data;
        receive the compressed IQ data from the FPGA;
        decompress the compressed IQ data; and
        provide the decompressed IQ data to one or more operational subsystems, the operational subsystems comprising at least one of a display subsystem, an analysis subsystem, or a storage subsystem.

10. The test device of claim 9, wherein the CPU is further to:
    in response to a determination that the size of the digital IQ data is less than the data transfer rate, deactivate the compression function at the FPGA.

11. The test device of claim 9, wherein the CPU is further to store the decompressed IQ data in one or more of a universal serial bus (USB) memory or a flash memory.

12. The test device of claim 9, wherein each ADC of the ADC subsystem includes a digital down-converter.

13. The test device of claim 9, wherein the FPGA includes a double data rate (DDR) memory.

14. The test device of claim 9, wherein the plurality of high-capacity connections comprise JEESD204B/C connections and the other one or more high-capacity connections comprise PCIe connections.

15. The test device of claim 9, wherein the test device is a spectrum analyzer.

16. A method, comprising:
- receiving, at an analog-digital converter (ADC) subsystem of a test device, down-converted radio frequency (RF) signals from a mixer of the test device;
- converting, at the ADC subsystem, the down-converted RF signals to digital IQ data;
- transmitting, from the ADC subsystem, the digital IQ data over a plurality of high-capacity connections to a field programmable gate array (FPGA) and a central processing unit (CPU) of the test device;
- determining, by the CPU, whether the digital IQ data from the ADC subsystem is to be compressed based on a comparison of a size of the digital IQ data and a data transfer rate;
- in response to a determination that the size of the digital IQ data is greater than the data transfer rate, activating, by the CPU, a compression function at the FPGA to cause the FPGA to compress the digital IQ data
- compressing, at the FPGA, the digital IQ data;
- transmitting, by the FPGA, the compressed IQ data over other one or more high-capacity connections to the CPU;
- decompressing, by the CPU, the compressed IQ data; and
- providing, by the CPU, the decompressed IQ data to one or more operational subsystems of the test device, the operational subsystems comprising at least one of a display subsystem, an analysis subsystem, or a storage subsystem.

17. The method of claim 16, further comprising:
in response to a determination that the size of the digital IQ data is less than the data transfer rate, deactivating the compression function at the FPGA.

18. The method of claim 16, wherein
the ADC subsystem comprises a plurality of ADCs; and
each of the plurality of ADCs includes a digital down-converter.

19. The method of claim 16, further comprising:
storing the digital IQ data in one or more of a universal serial bus (USB) memory or a flash memory connected to the CPU.

20. The method of claim 16, further comprising:
- receiving, at a front end of the test device, one or more RF signals;
- pre-processing the received RF signals; and
- down-converting the pre-processed RF signals, at the mixer of the test device, to obtain the down-converted signals.

* * * * *